United States Patent [19]

Larsen

[11] 4,080,887
[45] Mar. 28, 1978

[54] SCRAP VEHICLE WHEEL CRUSHER

[76] Inventor: Oliver L. Larsen, Rte. No. 2, Weyauwega, Wis. 54983

[21] Appl. No.: 754,543

[22] Filed: Dec. 27, 1976

[51] Int. Cl.² .............................................. B30B 7/04
[52] U.S. Cl. ....................................... 100/35; 29/403; 29/427; 72/402; 100/100; 100/232; 100/269 R
[58] Field of Search .................. 100/42, 232, 100, 295, 100/35, 269 R; 29/403, 427, 235; 72/402

[56] References Cited

U.S. PATENT DOCUMENTS

| 3,020,831 | 2/1962 | Barnes | 100/232 |
|---|---|---|---|
| 3,106,888 | 10/1963 | Chapleau | 100/232 |
| 3,885,292 | 5/1975 | Sharp | 29/403 |

Primary Examiner—Billy J. Wilhite
Attorney, Agent, or Firm—Andrus, Sceales, Starke & Sawall

[57] ABSTRACT

The wheel rim to be crushed with the tire on it is placed horizontally upon a support and three pusher heads are moved radially inward against the tire by equalized hydraulic cylinders spaced equally about the circumference. A frame with three radially disposed beams supports the cylinders and a slide interlock between each pusher head and the corresponding beam retains the head in the plane of the wheel rim and tire.

7 Claims, 6 Drawing Figures

SCRAP VEHICLE WHEEL CRUSHER

BACKGROUND OF THE INVENTION

This invention relates to a scrap vehicle wheel crusher.

Heretofore vehicle wheels have been crushed by an apparatus intended to cut them in two across the diameter with the tire still on.

This apparatus takes substantial power and often fails to sever the rim with the result that the partially severed rim and tire becomes attached to the knife and swings out of place to become a dangerous missile apt to injure the operator or cause other damage.

SUMMARY OF THE INVENTION

In contrast, the present invention pushes the tire and the rim with it radially inward at three or more equally circumferentially spaced locations until the metal rim is crushed into a shape having a plan like a three leaf clover.

When the pusher heads are retracted the tire springs back to circular shape away from the rim greatly facilitating separation of the tire from the rim when the two are removed from the crusher.

The apparatus for accomplishing this generally comprises a frame of three or more radially disposed horizontal support beams rigidly connected at the center and individually supporting corresponding hydraulic cylinders disposed to actuate the pusher heads by operating an equalized force thereon.

The pusher heads are interlocked with the corresponding beams by slide means that provide for movement of the heads along the beams in the general plane of the wheel being crushed while preventing accidental raising of any head by reason of the pressures exerted.

The entire frame is mounted for trailing a vehicle by providing the usual trailer hitch on the end of one beam and suitable wheel supports at the ends of the other two beams.

The hydraulic power fluid is supplied by an engine and pump mounted between the two wheel supported beams and suitable control valve means are carried by the other beam.

BRIEF DESCRIPTION OF THE DRAWING

The invention is illustrated in the accompanying drawings showing the preferred embodiment presently contemplated by applicant.

DESCRIPTION OF THE PREFERRED EMBODIMENT

Figure 1:
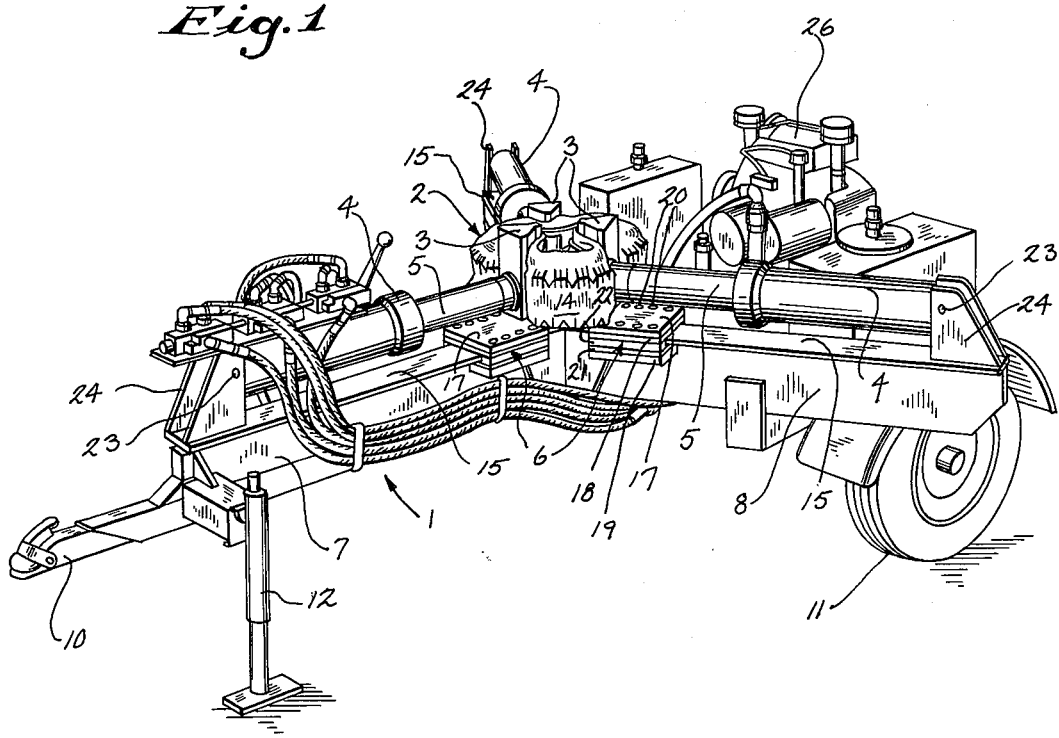
FIG. 1 is a perspective view of the wheel crusher.
Figure 4:
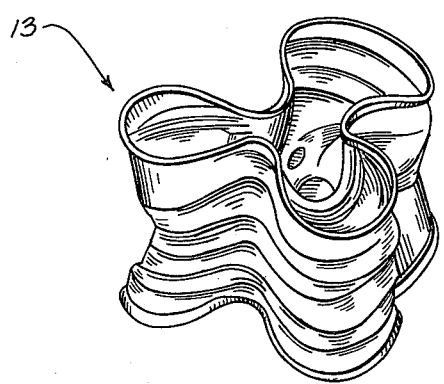
FIG. 4 is a perspective view of the crushed rim after the tire has been removed from it.
Figure 2:
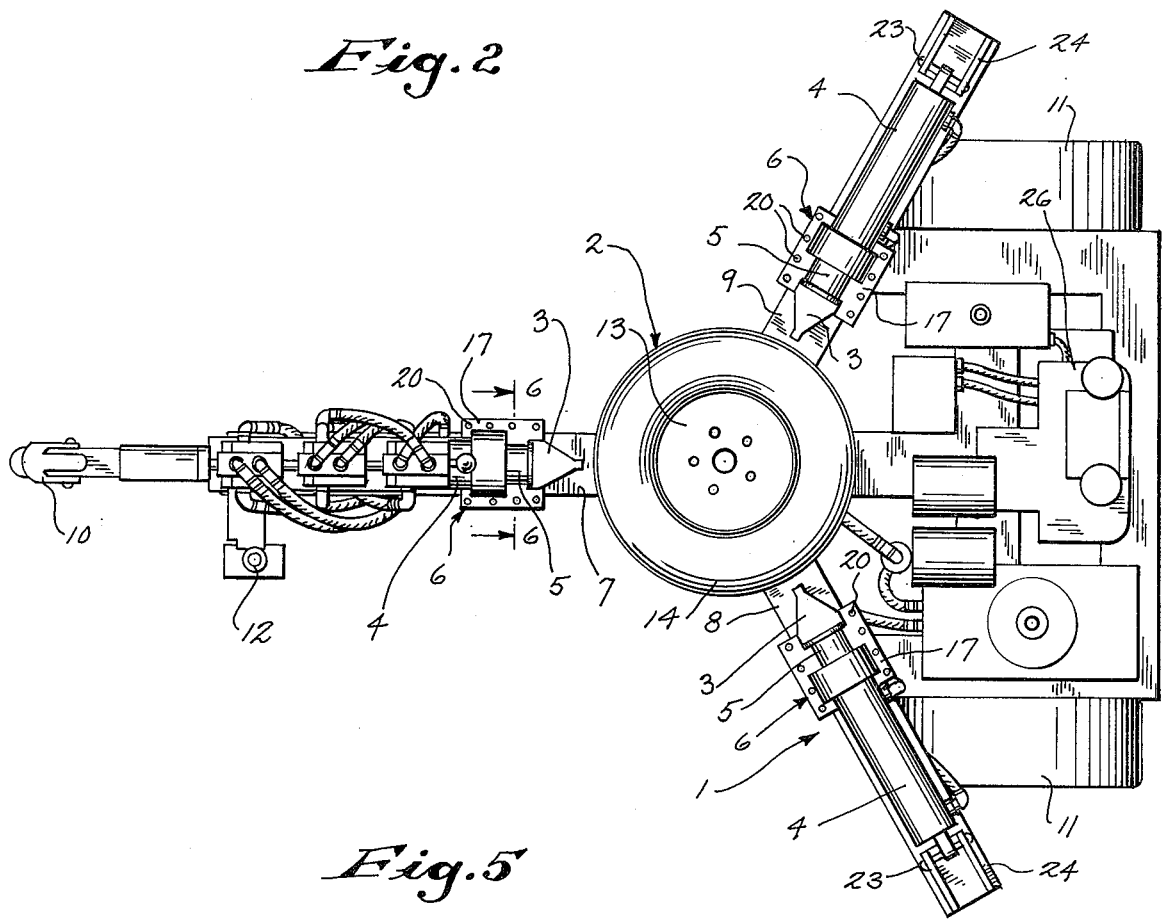
FIG. 2 is a top plan view of the crusher of FIG. 1 with a wheel in position prior to crushing.
Figure 5:
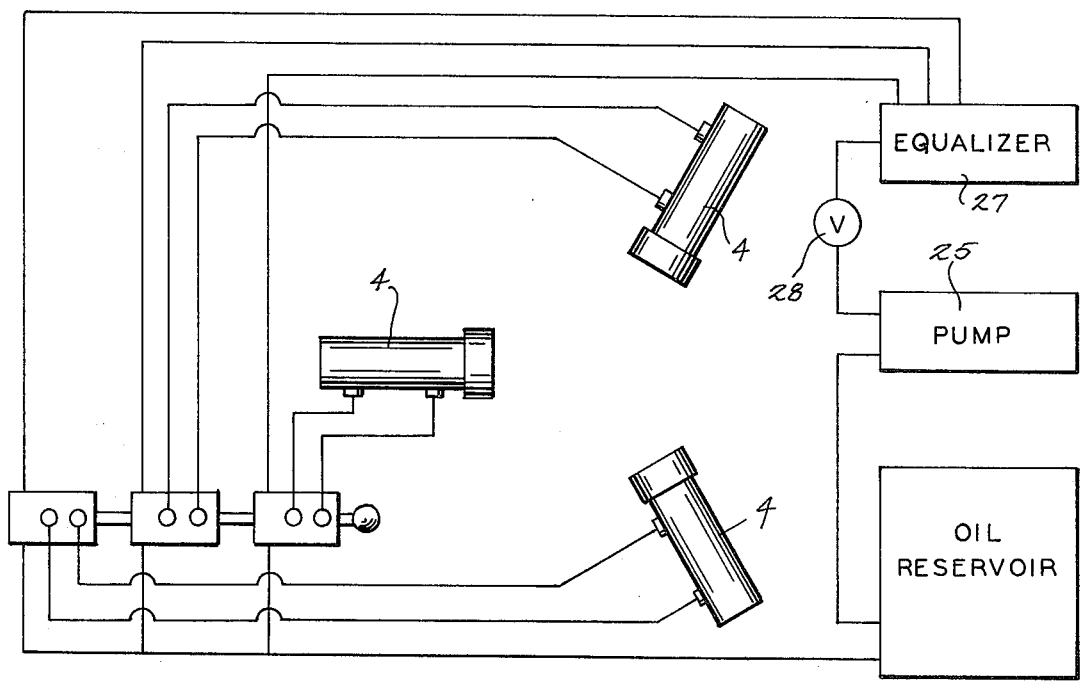
FIG. 5 is a schematic view of the hydraulic circuit for operating the cylinders.
Figure 3:
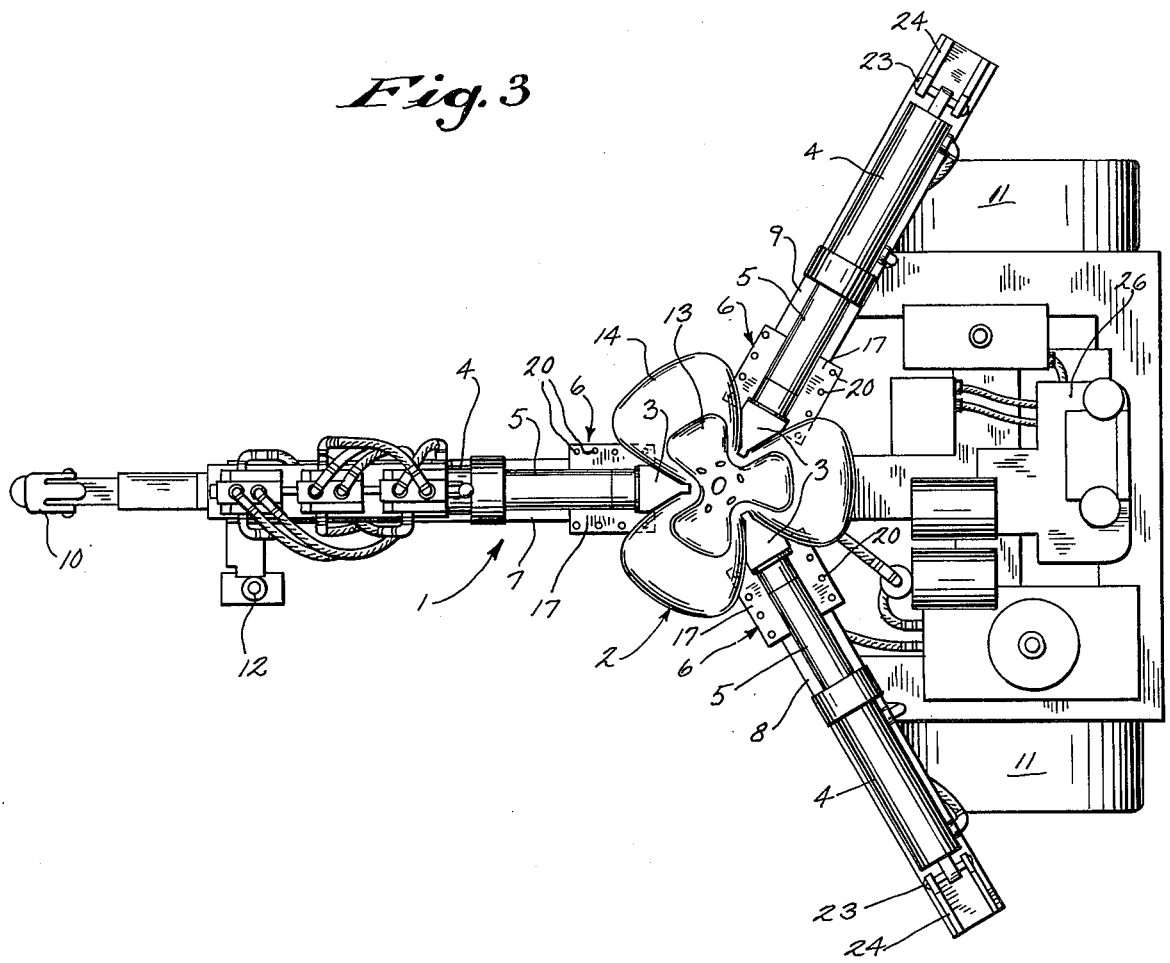
FIG. 3 is a view similar to FIG. 2 showing the pusher heads in fully actuated position with the wheel crushed therebetween.
Figure 6:
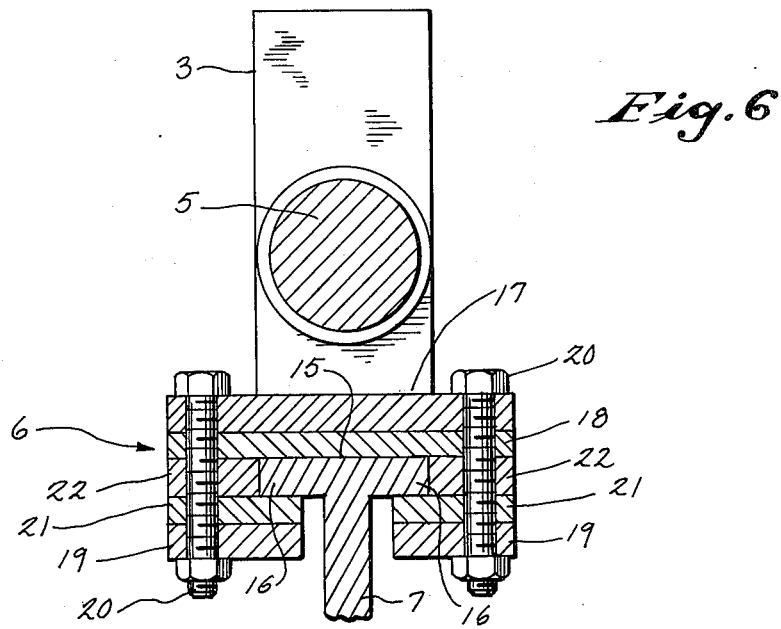
FIG. 6 is a detail section of a slide interlock taken on line 6—6 of FIG. 2.

The wheel crusher illustrated in the drawings comprises in general a mobile frame 1 adapted to support a wheel 2 to be crushed centrally thereof, three or more radially movable pusher heads 3 disposed substantially equally spaced circumferentially of the wheel 2, a suitable hydraulic cylinder 4 mounted on the frame and having its plunger 5 connected to a corresponding pusher head to actuate the same, and interlocking means 6 between the frame 1 and the pusher heads 3 to retain the latter in the general horizontal plane of the wheel 2.

The frame 1 generally comprises three or more radially disposed beams 7, 8 and 9 rigidly secured together at the center of the frame and equally spaced circumferentially.

For mobility purposes beam 7 is provided with a trailer hitch 10 for attachment to a vehicle, and beams 8 and 9 are supported by suitable rubber tire wheels 11. A suitable jack 12 is provided for supporting the front end of beam 7 when it is not hitched to a vehicle and retaining the frame stationary during crushing operations.

The wheel 2 to be crushed generally comprises the metal rim 13 and the rubber tire 14 thereon.

The wheel 2 is disposed horizontally upon frame 1 centrally thereof above the central securement for beams 7, 8 and 9.

The pusher heads 3 comprise blunt nosed blocks generally wedge shaped in plan view spaced equally circumferentially about the location for the wheel 2.

The backside of each pusher head 3 is secured to the end of a corresponding plunger 5 for actuation of the head along the top of the corresponding beam 7, 8 or 9.

For the purpose of the interlocking means 6 each beam 7, 8 and 9 has a flat top 15 with undercut side edges 16 as may be provided with an I-beam shape or a T-beam shape, and each pusher head 3 is carried on a top plate 17 which is in turn supported by a slide bearing plate 18 upon the beam.

The interlock is obtained by providing a bottom plate 19 suspended from the top plate 17 by bolts 20 on each side of the beam and which plate 19 supports a slide bearing plate 21 upwardly against the corresponding undercut side edge 16.

A spacer member 22 is disposed in the area of bolts 20 between the slide plates 18 and 21, and has a thickness generally corresponding to and slightly in excess of the thickness of the corresponding side edge 16.

Each cylinder 4 in which a plunger 5 operates is pivoted on a horizontal axis 23 at its outer end to an upstanding bracket 24 on the outer end of the corresponding beam 7, 8 or 9.

Power fluid is supplied to the cylinders 4 from a suitable pump 25 driven by engine 26, both mounted on the frame 1 between beams 8 and 9.

The flow of fluid from pump 25 to the several cylinders 4 is equalized by a suitable equalizing valve 27, and the supply of fluid is controlled by the manual shut-off valve 28 in the discharge line from pump 25 ahead of valve 27.

Various modes of carrying out the invention are contemplated as being within the scope of the following claims particularly pointing out and distinctly claiming the subject matter which is regarded as the invention.

I claim:

1. The method of crushing a vehicle wheel rim with a tire thereon comprising applying radial pressure upon at least three substantially equally circumferentially spaced locations against the tire to move the latter inwardly against the rim and collapse the rim, thereupon releasing the pressure and removing the tire from the collapsed rim.

2. Apparatus for crushing a vehicle wheel rim with the tire thereon, comprising a pusher head for applying radial pressure upon each of at least three substantially equally circumferentially spaced locations against the tire to move the latter inwardly against the rim and collapse the rim, hydraulic means for moving each said pusher head and comprising a power cylinder with a plunger operatively connected to each corresponding pusher head, means mounting each said cylinder upon a radially extending beam with the several beams rigidly secured centrally of the apparatus to constitute a frame therefor, and slide means supporting each pusher head upon the corresponding beam and interlocking the same against any tendency for said pusher head to raise from the beam.

3. The construction of claim 2 in which said interlocking slide means comprises a longitudinal flange on each said beam, and means constituting a part of said slide means engaging beneath said flange.

4. The construction of claim 2 in which said power cylinders are actuated by a hydraulic pump mounted on said frame, an engine driving said pump and control means between said pump and cylinders.

5. The construction of claim 6 in which said last named means comprises an equalizing valve connecting said pump to said cylinders.

6. The construction of claim 2 and wheel supports for two of said beams, and a trailer hitch for the third beam to provide mobility for the apparatus.

7. The construction of claim 2 in which the mounting means for said cylinders comprises a pivotal connection between the outer end of each cylinder and a bracket on the corresponding beam, said pivotal connection having a substantially horizontal axis in the general plane of the wheel to be crushed whereby the pressure forces are transmitted radially toward the wheel without substantial deflecting components.

* * * * *